(12) United States Patent
Biskeborn et al.

(10) Patent No.: US 8,310,777 B2
(45) Date of Patent: Nov. 13, 2012

(54) SYSTEMS AND METHODS FOR REDUCING CROSSTALK BETWEEN ADJACENT WRITERS

(75) Inventors: Robert G. Biskeborn, San Jose, CA (US); Philipp Herget, San Jose, CA (US); Pierre-Olivier Jubert, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 136 days.

(21) Appl. No.: 12/556,452

(22) Filed: Sep. 9, 2009

(65) Prior Publication Data

US 2011/0058271 A1   Mar. 10, 2011

(51) Int. Cl.
*G11B 15/12* (2006.01)

(52) U.S. Cl. ............... 360/61; 360/46; 360/63; 360/75; 360/77.12

(58) Field of Classification Search .................. None
See application file for complete search history.

(56) References Cited

U.S. PATENT DOCUMENTS

| | | | | |
|---|---|---|---|---|
| 4,388,656 | A | | 6/1983 | Lemke |
| 4,521,817 | A | * | 6/1985 | Sasamura et al. ............... 360/46 |
| 4,525,753 | A | * | 6/1985 | Shimeki et al. ................. 360/45 |
| 4,821,127 | A | * | 4/1989 | Soga et al. ...................... 360/66 |
| 4,903,151 | A | * | 2/1990 | Mizukami et al. ......... 360/78.01 |
| 4,965,681 | A | * | 10/1990 | Takimoto ........................ 360/64 |
| 5,027,245 | A | * | 6/1991 | Nagata et al. ................. 360/121 |
| 5,307,214 | A | * | 4/1994 | Kawakami et al. ............. 360/61 |
| 5,359,466 | A | * | 10/1994 | Fuji et al. ........................ 360/46 |
| 5,896,239 | A | * | 4/1999 | Maki et al. ...................... 360/46 |
| 6,157,508 | A | * | 12/2000 | Usami ............................. 360/64 |
| 6,307,692 | B1 | * | 10/2001 | Brown et al. ................... 360/45 |
| 6,330,123 | B1 | * | 12/2001 | Schwarz et al. ................ 360/75 |
| 6,356,404 | B1 | * | 3/2002 | Nguyen .......................... 360/66 |
| 6,646,830 | B2 | * | 11/2003 | Biskeborn et al. ............ 360/129 |
| 6,781,784 | B2 | * | 8/2004 | Peterson ......................... 360/76 |
| 7,031,089 | B2 | * | 4/2006 | Hansen et al. .................. 360/61 |
| 7,218,581 | B2 | | 5/2007 | Frisson et al. ............. 369/44.32 |
| 2002/0196573 | A1 | * | 12/2002 | Kim et al. ....................... 360/67 |

(Continued)

FOREIGN PATENT DOCUMENTS

JP        55-108906        8/1980

(Continued)

OTHER PUBLICATIONS

International Search Report and Written Opinion from Application No. PCT/EP2010/062308 dated Jan. 27, 2011.

*Primary Examiner* — Dismery Mercedes
(74) *Attorney, Agent, or Firm* — Zilka-Kotab, PC

(57) ABSTRACT

In one general embodiment, a recording system controller includes a controller controlling a timing of flux switching of adjacent pairs of writers such that the writers in a given pair do not switch substantially concurrently, and reducing a current of one of the writers in the pair while the adjacent writer is writing a transition. In another general embodiment, a recording system controller includes a controller controlling a timing of pulse writing of adjacent pairs of writers such that the writers in a given pair do not pulse substantially concurrently. In yet another general embodiment, a method includes controlling a timing of pulse writing or flux switching of adjacent pairs of writers such that the writers in a given pair do not pulse or switch substantially concurrently.

20 Claims, 6 Drawing Sheets

U.S. PATENT DOCUMENTS

| | | | |
|---|---|---|---|
| 2005/0134991 A1* | 6/2005 | Hansen et al. | 360/64 |
| 2005/0168865 A1* | 8/2005 | Simmons et al. | 360/77.12 |
| 2005/0286158 A1* | 12/2005 | Bui et al. | 360/77.12 |
| 2008/0037154 A1 | 2/2008 | Biskeborn et al. | |
| 2008/0068752 A1* | 3/2008 | Biskeborn | 360/129 |
| 2008/0137235 A1* | 6/2008 | Biskeborn et al. | 360/317 |

FOREIGN PATENT DOCUMENTS

| | | |
|---|---|---|
| JP | 57-203205 | 12/1982 |
| JP | 62273610 | 11/1987 |
| JP | 07-244808 | 9/1995 |
| JP | 08-180302 | 7/1996 |

\* cited by examiner

SYSTEMS AND METHODS FOR REDUCING CROSSTALK BETWEEN ADJACENT WRITERS

BACKGROUND

The present invention relates to writing information to magnetic media, and more particularly, this invention relates to reducing crosstalk between adjacent writers.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For magnetic storage systems such as tape- and disk-based storage, that goal has lead to increasing the track density on the recording medium, and decreasing the thickness of the magnetic medium. However, using a tape storage system as an example, the development of small footprint, higher performance tape drive systems has created various problems in the design of a tape head assembly for use in such systems.

In a tape drive system, magnetic tape is moved over the surface of the tape head at high speed, where multiple writers operate at the same time to write data to the tape. In designing a tape system it is desirable to locate the writers close together such that the total span of the head is minimized. This prevents the outer writers from going off track in the face of expansion or contraction of the tape, as is caused by environmental changes. However, as the spacing between the writers becomes smaller and smaller, problems such as crosstalk tend to emerge.

Crosstalk is a phenomenon that can occur when two closely spaced adjacent writers perform writing operations substantially concurrently and the pattern written by the first writer is affected by the magnetic flux created by the adjacent second writer, thereby degrading or otherwise adversely affecting the written information from the first writer.

It is favorable to reduce or eliminate this crosstalk between adjacent heads to improve writing operation efficiency and accuracy.

SUMMARY

In one general embodiment, a recording system controller includes a controller controlling a timing of flux switching of adjacent pairs of writers such that the writers in a given pair do not switch substantially concurrently, and reducing a current of one of the writers in the pair while the adjacent writer is writing a transition.

In another general embodiment, a recording system controller includes a controller controlling a timing of pulse writing of adjacent pairs of writers such that the writers in a given pair do not pulse substantially concurrently.

In yet another general embodiment, a method includes controlling a timing of pulse writing or flux switching of adjacent pairs of writers such that the writers in a given pair do not pulse or switch substantially concurrently.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a recording system controller includes a controller controlling a timing of flux switching of adjacent pairs of writers such that the writers in a given pair do not switch substantially concurrently, and reducing a current of one of the writers in the pair while the adjacent writer is writing a transition.

In another general embodiment, a recording system controller includes a controller controlling a timing of pulse writing of adjacent pairs of writers such that the writers in a given pair do not pulse substantially concurrently.

In yet another general embodiment, a method includes controlling a timing of pulse writing or flux switching of adjacent pairs of writers such that the writers in a given pair do not pulse or switch substantially concurrently.

"Flux switching," typically refers to current reversal, or switching to the opposite current state, which creates a magnetic transition on a magnetic medium. Also, an "adjacent pair" of writers in many embodiments refers to writers that are immediately adjacent one another, while in other embodiments an adjacent pair of writers may simply be two writers in the same array. A "writer" typically includes a write transducer in a head.

Figure 1:
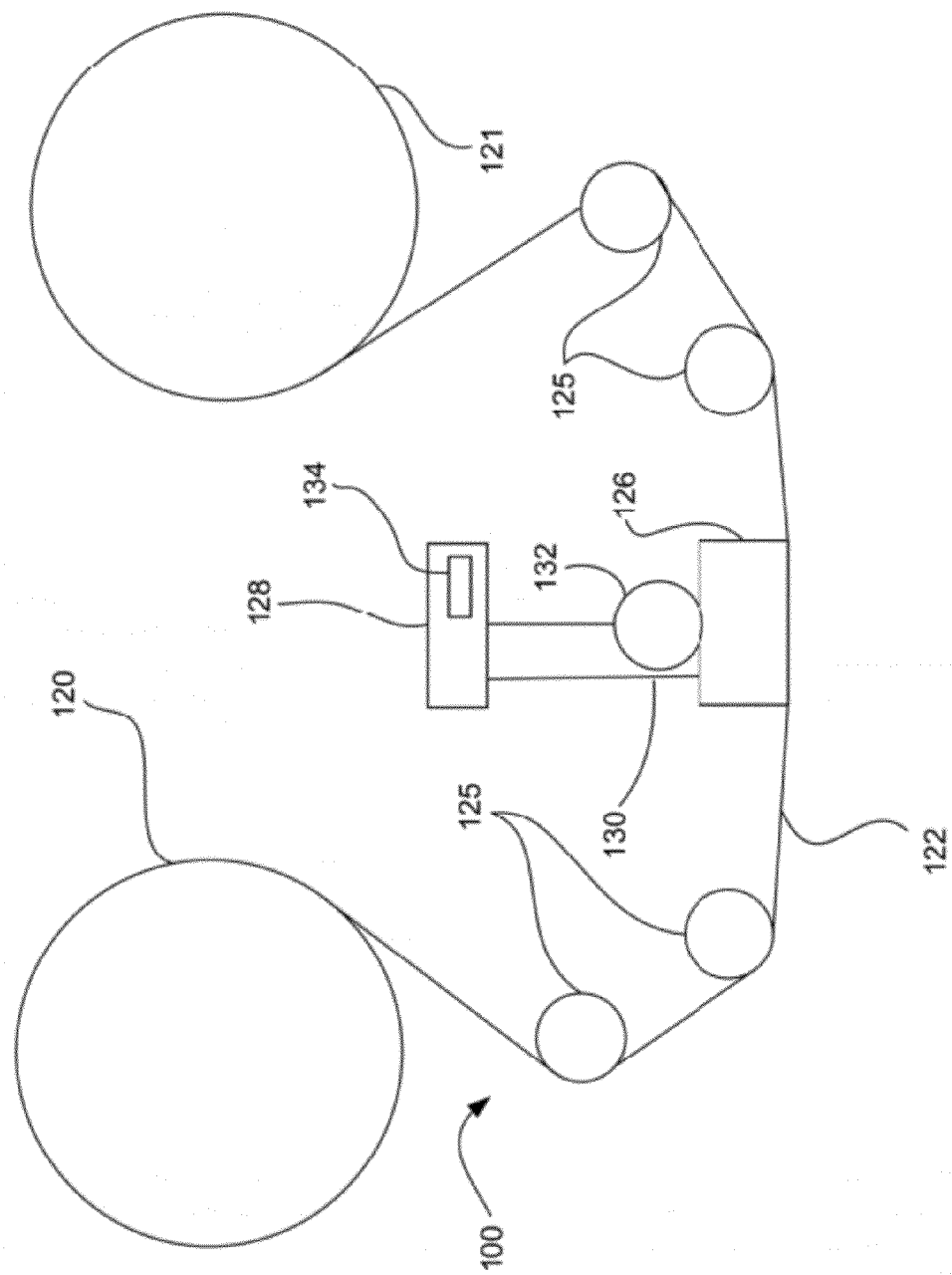
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

A tape drive system such as that shown in FIG. 1 may be comprised of a magnetic head 126 comprising a plurality of writers; a drive mechanism for passing a magnetic recording tape 122 over the head 126; a controller 128 in communication with the head 126. The controller controls a timing of flux switching of adjacent pairs of the writers such that the writers in a given pair do not switch substantially concurrently, and reduces a current of one of the writers in the pair while the adjacent writer is switching. The writers in this embodiment may be formed on a common substrate to reduce manufacturing steps and cost.

In another embodiment of the above mentioned system, the current may be reduced to about zero for one writer in a pair while the adjacent writer is writing a transition via flux switching.

In another embodiment, more than one pair of adjacent writers may be present. In one approach, writers in first predefined positions switch concurrently, wherein writers in second predefined positions switch concurrently. For example, writers in an odd position (e.g., 1, 3, 5 . . . as counted from an outer writer) switch concurrently and writers in an even position (e.g., 0, 2, 4 . . . ) switch concurrently. Another approach may switch every fourth writer concurrently (i.e., 1&5, 2&6, 3&7, etc.). Any other useful switching pattern could be used with the present embodiment as long as adjacent writers do not switch concurrently to avoid crosstalk.

Figure 2:
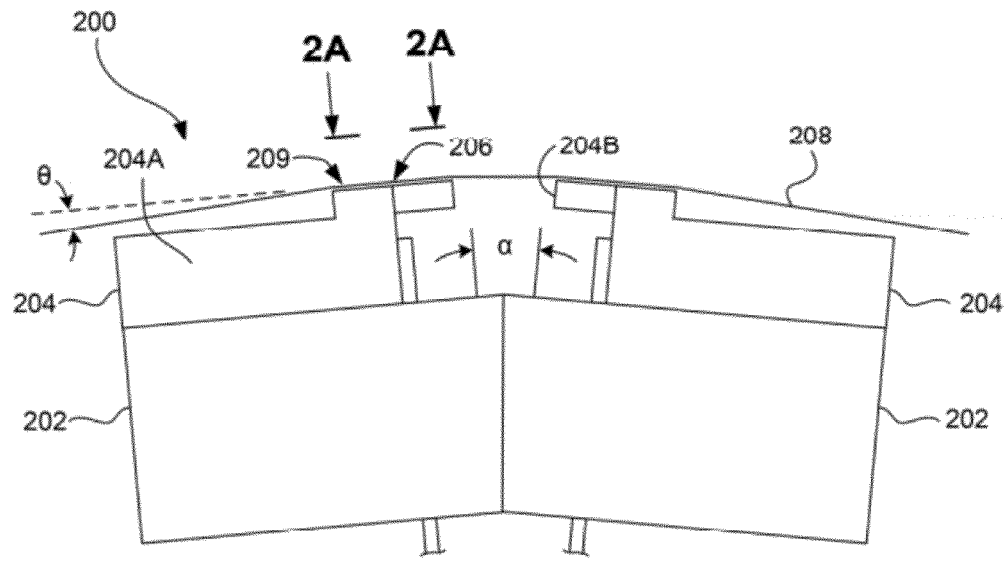
FIG. 2 illustrates a side view of a flat-lapped, bidirectional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle a with respect to each other. The bases are typically "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo readers.

Figure 2A:
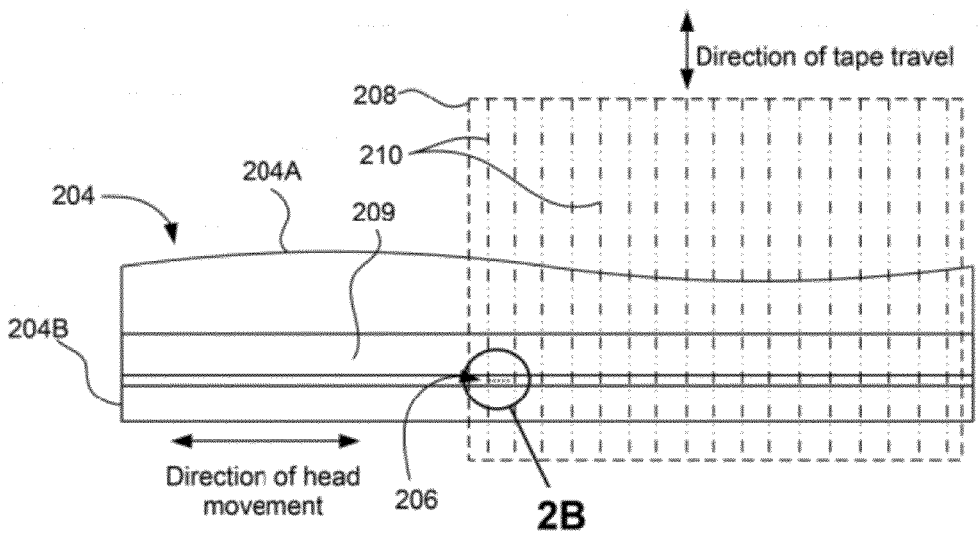
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 12-22 data bands, e.g., with 16 data bands and 17 servo tracks 210, as shown in FIG. 2A on a one-half inch wide tape 208. The data bands are defined between servo tracks 210. Each data band may include a number of data tracks, or example 96 data tracks (not shown). During read/write operations, the readers and/or writers 206 are positioned within one of the data bands. Outer readers, sometimes called servo readers, read the servo tracks 210. The servo signals are in turn used to keep the readers and/or writers 206 aligned with a particular track during the read/write operations.

Figure 2B:
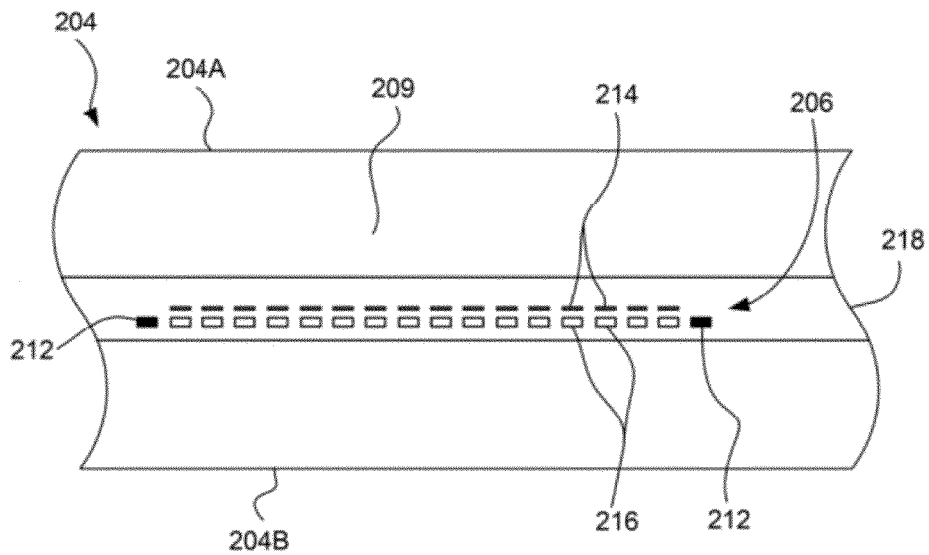
FIG. 2B is a detailed view taken from Circle 2B of FIG. 2A.

FIG. 2B depicts a plurality of readers and writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, and 40 readers and/or writers per array 206. A preferred embodiment includes 32 readers per array and/or 32 writers per array. This allows the tape to travel-more slowly, thereby reducing speed-induced tracking and mechanical difficulties. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
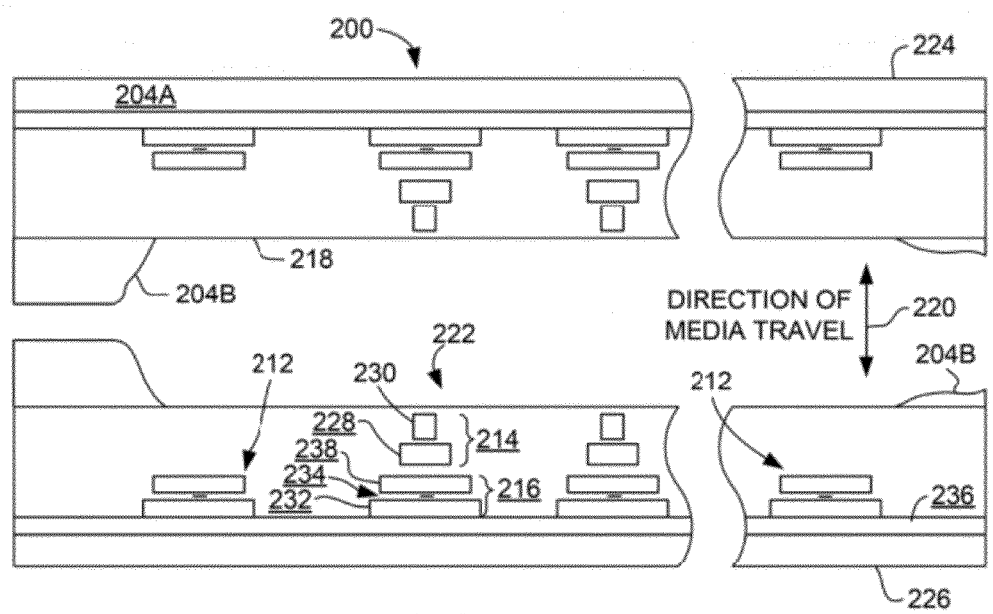
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

In most magnetic storage systems, the desired magnetic pattern is created oil a moving magnetic medium by alternating the current supplied to the write transducer. With each change in current, a transition is created, and the existence and position of these transitions is used to encode the data onto the medium. In several of the embodiments presented however, the head will be used in a different manner. Specifically, the head current will be altered using a method which minimizes the effects of crosstalk, but does not affect the recorded pattern. To show show this is possible, we must first examine how transitions are written to the magnetic medium.

Figure 3A:
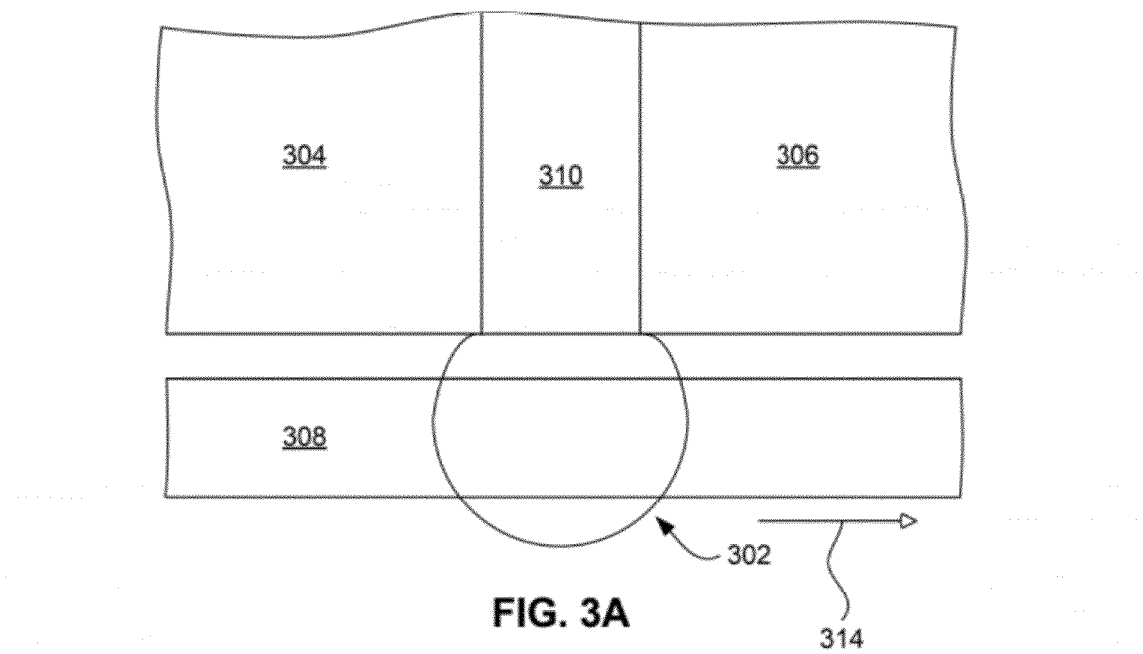
FIG. 3A is a schematic diagram of a write bubble.
Figure 3B:
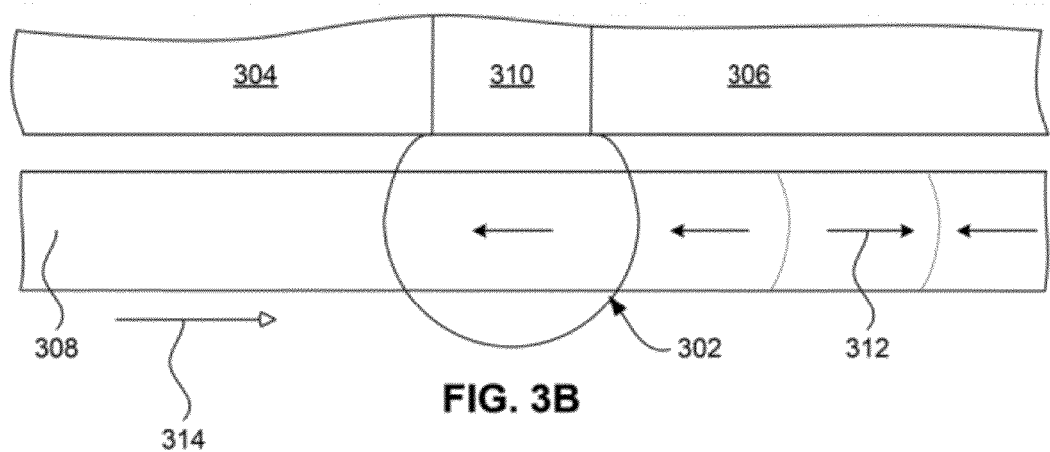
FIG. 3B is a schematic diagram of written bits on magnetic media.

With reference to FIG. 3A, when a writer is on, the magnetization of the medium 308 is altered under the writer in an area known as the write bubble 302. The write bubble is the volume below the write head in which the field generated by the write head is large enough to switch the medium magnetization, thereby writing the medium. In a typical recording system, data is stored by switching the write current, which creates transitions in the direction of magnetization in the medium. These transitions are defined by the trailing edge of the write bubble. Referring to FIG. 3B, the individual areas of magnetization between transitions are shown as arrows 312. The write bubble 302 results from the magnetic field between the first pole 304 and second pole 306. The width of this write bubble 302 is similar to the width of the write gap 310. For a current tape drive it is approximately 300 nanometers (nm) in the down track direction. Therefore, when the writer is being used to magnetize the medium 308, the trailing and leading edge of the written area are therefore 300 nm apart.

During the recording of data, the medium is moving with respect to the writer. This motion is indicated by the arrow 314 shown in FIG. 3B. If the head is briefly turned off, the medium 308 will remain continuously magnetized as long as the head travels less than the 300 nm distance between the transition edges before it is turned on again. Thus the write current can include periods during which the head is off while still writing a continuous pattern. This effect can be exploited to alter the writer current without affecting the written magnetic pattern. This will be the for any distance between the leading edge and trailing edge as long as the writer is switched on again before this distance has been traveled by the media.

This was confirmed using simulations with a head supplied with a pulsed current while recording onto longitudinal media. The read back waveform remained unchanged from the DC continuous case as long as the duration between pulses was small. However, when the duration between pulses passes 326 nm on a head having a write gap of about 300 nm, the quality of the read back signal begins to degrade. This simulation was carried out for a head media spacing of 30 nm and deep gap field such that the written transition is straight in the media. Similar results were also obtained for non-oriented media.

At tape velocity of 10 m/s in direction 314, a 300 nm distance will take 30 nanoseconds (ns) to traverse. For a recording system with a head switching time of about 2-3 ns, there is more than enough margin to switch the head off and on again without interrupting the state of the magnetization in the medium.

The ability to briefly reduce the writer current can be applied to minimize crosstalk between writers by ensuring that two adjacent writers do not switch substantially concurrently. This can be accomplished by placing the nearest simultaneously-written track's transitions out of phase with each other such that the transitions never occur concurrently. Minimizing crosstalk may also include turning each writer off, or lowering the current, while the adjacent writers are switching.

One method of accomplishing turning each writer off, or lowering the current, without taking into consideration the specific data pattern that is being written is to switch off each writer at a regular interval. This creates a dedicated window in which the adjacent writers can switch and simplifies the design.

Figure 4:
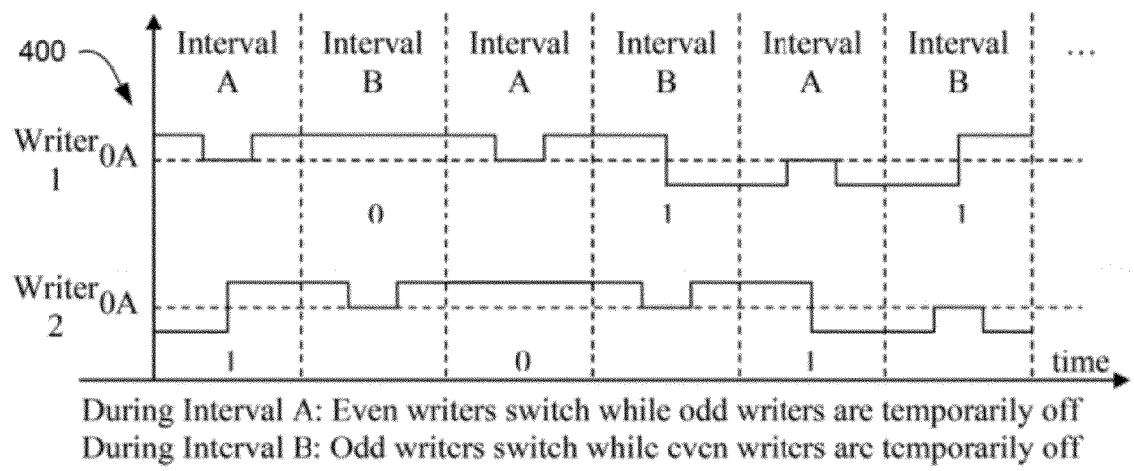
FIG. 4 is a diagram of current versus time for Writer 1 and Writer 2 using the present method of switching only one writer at a time.

FIG. 4 shows a schematic of the currents in two adjacent writers following one of the proposed embodiments. In this embodiment, a timing of flux reversal of adjacent pairs of writers is controlled such that the writers in a given pair do not switch substantially concurrently. Furthermore, a current of one of the writers in the pair is reduced while the adjacent writer is switching. This mitigates crosstalk between the adjacent writers which can degrade the information written to the media. The idea can be extended to any number of writers by numbering them sequentially and creating an even and an odd set of writers. In this figure, during Intervals A, even writers (0, 2, 4 . . . ) are allowed to write transitions by switching while odd writers (1, 3, 5 . . . ) are temporarily off. During Interval B, odd writers are allowed to write transitions by switching while even writers are temporarily off. In this example, each transition is used to record a 1, while the absence of a transition records a 0.

In a real implementation of this embodiment, timing of the off duration and transition spacing would be adjusted to optimize recording performance. Since the writer crosstalk may also disappear at low current levels, an alterative to switching the writers off is to switch the writers to a low current state.

Figure 5:
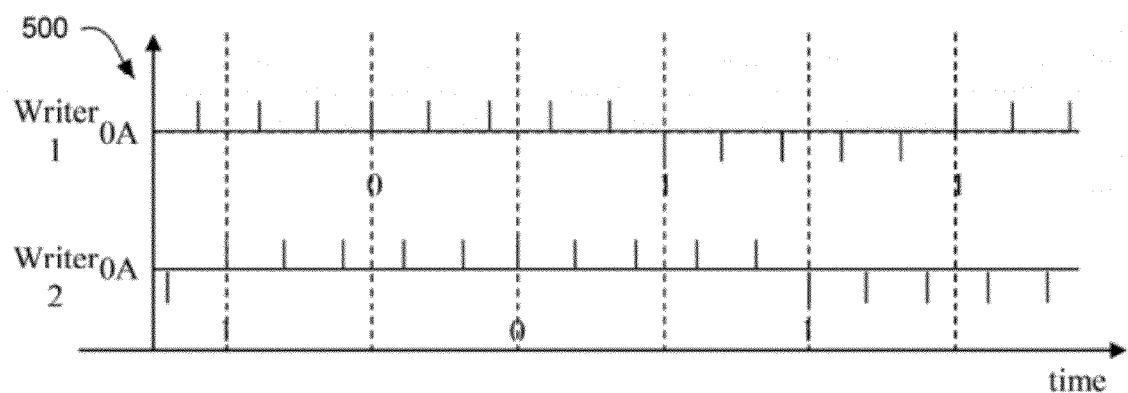
FIG. 5 is a diagram of current versus time for Writer 1 and Writer 2 using the present method of pulsing only one writer at a time.

In another embodiment, pulse writing is used instead of continuous writing as shown in FIG. 5. Here, the magnetic information is recorded using a series of pulses which are shown as vertical lines extending up or down from the 0 Ampere (0 A) line for Writer 1 and Writer 2. The dashed vertical lines indicate locations where transitions need to be written onto the medium to represent the data pattern. To ensure that crosstalk is eliminated, the pulses of the adjacent Writers 1 and 2 are out of phase such that adjacent writers are never powered simultaneously. In this particular example, each writer is pulsed 5 times within the written bit cell. When designing the system, this number may be adjusted for more optimal recording performance. Switching off the writers can be accomplished in an H driver write circuit by turning off all transistors in the driver. Other methods known to those in the art may also be used. In this example, a current reversal in the writer is used to create a transition on the magnetic medium which represents a 1, whereas the absence of a reversal is used to represent a 0.

In these embodiments, the writers in the head are grouped into odd and even numbered writers which are interleaved. In the write waveform, there is a predetermined switching interval during which each set of writers may switch while the other set of writers is off. For the first implementation, a continuous waveform is used with short periods in which the writers are turned off to allow for the switching of the neighboring writers. Although these examples use groups of odd or even writers to determine which writers are switched and which are not, any scheme which allows for proper recording of information can be used with the embodiments discussed above.

Figure 6:
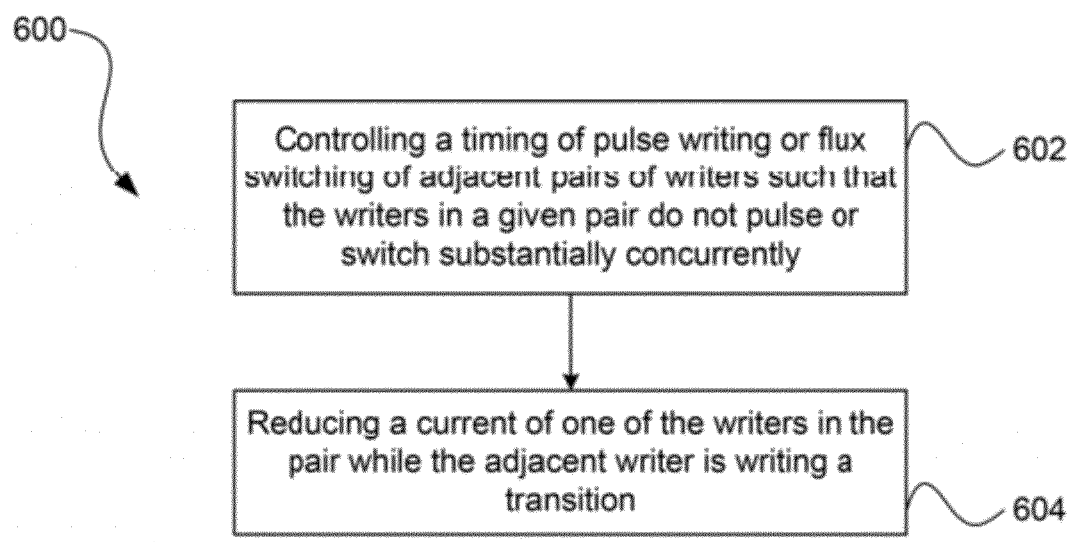
FIG. 6 is a flowchart illustrating a method according to one embodiment.

FIG. 6 illustrates a method according to one embodiment. As an option, the present method 600 may be implemented in the context of the functionality and architecture of FIGS. 1-5. However, the method 600 may be carried out in any desired environment. The aforementioned definitions may apply during the present description.

With continued reference to FIG. 6, in operation 602, a timing of pulse writing or flux switching of adjacent pairs of writers is controlled such that the writers in a given pair do not pulse or switch substantially concurrently. In particularly preferred embodiments, adjacent writers do not switch or pulse at the same time.

In optional operation 604, a current of one of the writers in the pair is reduced while the adjacent writer is writing a transition. In one embodiment, the current is reduced to about zero for one writer while the adjacent writer is writing a transition. In another embodiment, the current is reduced at regular intervals.

In one embodiment, the flux switching may create magnetic transitions in a magnetic layer of a magnetic medium. The transitions may be discernable using a magnetic sensor of a type previously known in the art, such as a magnetic reader.

In another embodiment, the controlling of the timing of the flux switching may create transitions on nearby simultaneously-written data tracks on a magnetic medium that are out of phase with each other.

In a further embodiment, the writers may be formed on a common substrate. This may reduce the processing steps and cost associated with manufacturing the writers. In yet another embodiment, more than one pair of adjacent writers may be present, wherein writers in an odd position (e.g., 1, 3, 5 . . . where the writers are numbered consecutively across the array) switch concurrently and wherein writers in an even position (e.g., 0, 2, 4 . . . ) switch concurrently. Another approach may switch every fourth writer concurrently (i.e., 1&5, 2&6, 3&7, etc.). Any other useful switching pattern could be used with the present embodiment as long as adjacent writers do not switch concurrently to avoid crosstalk.

Preferably any nearby writer that causes significant crosstalk does not switch concurrently with another nearby writer. By nearby, what is meant is that the writers are generally within range of a first writer to cause crosstalk on the first writer. Thus, the nearby writers may be in the same array, on a common substrate, etc. In general, the closer the writers are, the more pronounced the crosstalk will be. Thus, the methodology presented herein may apply to adjacent writers only, adjacent writer and their immediate neighbors, or more writers.

In another embodiment the switching pattern may be modified to protect against longer range crosstalk effects. For example to mitigate the crosstalk from a writer into the two adjacent writers. In this configuration, three sets of writers could be created such that the two nearest writers would be off or in a low current state while each writer is switching. The concept can be carried forward to any amount of crosstalk present in the system.

In another method according to one embodiment, a timing of pulse writing of adjacent pairs of writers may be controlled such that the writers in a given pair do not pulse substantially concurrently as illustrated in FIG. 5.

In another approach using pulsing of writers, the writers in a given pair may pulse intermittently.

In yet another approach using pulsing writers, the writers may pulse on regular intervals. This may simplify the logic to control the pulsing, and may reduce the programming time needed to develop the logic.

In a further approach using pulsing writers, the writers may be formed on a common substrate. This may reduce the processing steps and cost associated with manufacturing the writers.

In another approach using pulsing writers, more than one pair of adjacent writers may be present, wherein writers in an odd position (e.g., 1, 3, 5 . . . where the writers are numbered consecutively across the array) pulse concurrently and wherein writers in an even position (e.g., 0, 2, 4 . . . ) pulse concurrently. Another approach may pulse every fourth writer concurrently (i.e., 1&5, 2&6, 3&7, etc.). Any other useful pulsing pattern could be used with the present embodiment as long as adjacent writers do not pulse concurrently to avoid crosstalk.

It will also be clear to one skilled in the art that the method of the present invention may suitably be embodied in a logic apparatus comprising logic to perform various steps of the methodology presented herein, and that such logic may comprise hardware components or firmware components. Illustrative hardware components include FPGAs, PLAs, an ASIC, etc.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A recording system controller, comprising:
a controller configured to control a timing of flux switching of adjacent pairs of writers such that the writers in a given pair do not switch substantially concurrently when the writers in the pair are concurrently writing parallel data tracks, and to reduce a current of one of the writers in the pair while the adjacent writer is writing a transition in the data track being written thereby,
wherein the current is reduced at regular intervals.

2. A recording system controller as recited in claim 1, wherein the controller controls the timing of the switching to create transitions on simultaneously-written data tracks on a magnetic medium that are out of phase with each other.

3. A recording system controller as recited in claim 1, wherein the current is reduced to about zero while the adjacent writer is writing a transition.

4. A recording system controller as recited in claim 1, wherein the controller is further configured to receive a servo signal from a servo reader reading a servo track, the controller being configured to align the writers with the data tracks based on the servo signal from the servo reader.

5. A recording system controller as recited in claim 1, wherein the current of the one of the writers is reduced to a point that the one of the writers is no longer writing while the adjacent writer is writing a transition.

6. A recording system comprising the controller as recited in claim 1 and the writers, wherein the writers are formed on a common substrate.

7. A recording system controller as recited in claim 6, wherein writers in an odd position switch concurrently, wherein writers in an even position switch concurrently, wherein the current is reduced but not completely turned off thereby continuing to write with the reduced current.

8. A recording system controller as recited in claim 1, wherein writers in an odd position switch concurrently, wherein writers in an even position switch concurrently.

9. A recording system controller as recited in claim 1, wherein writers in first predefined positions switch concurrently, wherein writers in second predefined positions switch concurrently.

10. A recording system controller as recited in claim 9, wherein writers in third predefined positions switch concurrently.

11. A magnetic recording system, comprising:
a magnetic head comprising a plurality of writers;
a drive mechanism for passing a magnetic recording medium over the head;
a controller as recited in claim 1.

12. A recording system controller, comprising:
a controller configured to control a timing of flux switching of adjacent pairs of writers such that the writers in a given pair do not switch substantially concurrently when the writers are concurrently writing data tracks, and to reduce a current of one of the writers in the pair while the adjacent writer is writing a transition,
wherein a time period that the current is reduced is characterized in that a continuous pattern is written on a medium even when the current is reduced.

13. A recording system controller as recited in claim 12, wherein the current is reduced but not completely turned off, wherein the adjacent writers are arranged to write parallel data tracks.

14. A recording system comprising the controller as recited in claim 12, and further comprising the writers arranged to write parallel data tracks, wherein the writers are formed on a common substrate, wherein the writers in the given pair are never powered simultaneously.

15. A recording system, comprising:
a controller configured to control a timing of flux switching of adjacent pairs of writers such that the writers in a given pair do not switch substantially concurrently when the writers are concurrently writing parallel data tracks, and to reduce a current of one of the writers in the pair at regular intervals corresponding to times when the adjacent writer is writing a transition.

16. A method, comprising:
controlling a timing of pulse writing or flux switching of pairs of adjacent writers such that the writers in a given pair do not pulse or switch substantially concurrently, wherein the current of one of the writers in the given pair is reduced to a point that the one of the writers is no longer writing while the adjacent writer is writing a transition,
wherein a time period that the current is reduced is characterized in that a continuous pattern is written on a medium even when the current is reduced.

17. A method as recited in claim 16, wherein the current of the one of the writers in the given pair is reduced to about zero while the adjacent writer is writing a transition, wherein the pair of adjacent writers are arranged to write parallel data tracks.

18. A method as recited in claim 16, wherein the current is reduced on regular intervals.

19. A method as recited in claim 16, wherein the writers are formed on a common substrate, wherein the current is reduced but not completely turned off.

20. A method as recited in claim 16, further comprising receiving a servo signal from a servo reader reading a servo track, the controller being configured to align the writers with the data tracks based on the servo signal from the servo reader.

* * * * *